Patented Dec. 26, 1922.

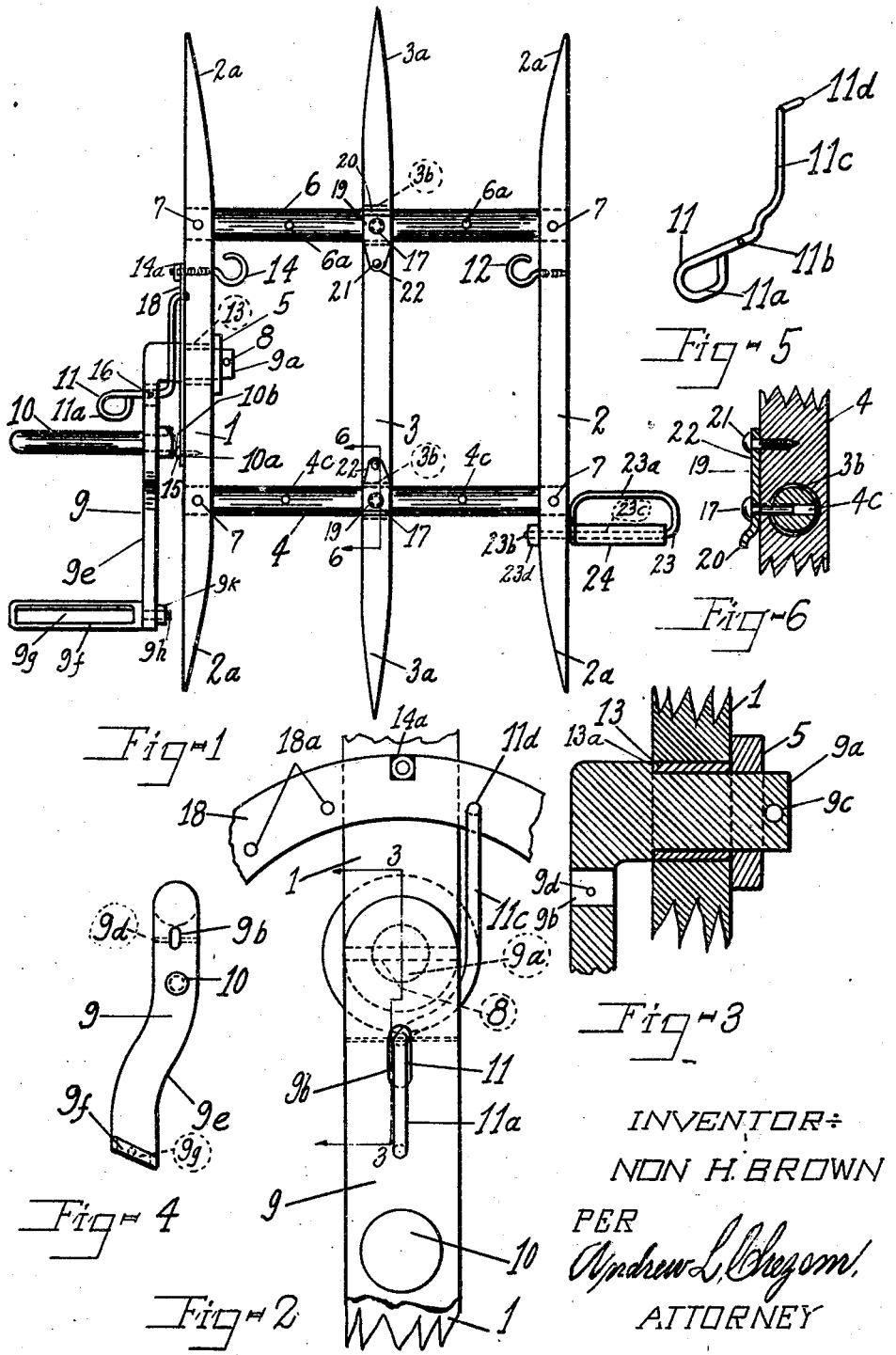

1,439,726

UNITED STATES PATENT OFFICE.

NON H. BROWN, OF DAVENPORT, IOWA.

LINE REEL.

Application filed January 9, 1922. Serial No. 527,814.

*To all whom it may concern:*

Be it known that I, NON H. BROWN, a citizen of the United States, residing at Davenport, in the county of Scott and State of Iowa, have invented a new and useful Improvement in Line Reels, of which the following is a specification.

My invention relates to improvements in line reels, in which a line is wound into crotches provided in the ends of a revolving frame, and is of that type commonly called "hand reels."

The objects of my invention are: first, to provide a hand reel capable of being held and unwound, wholly, partially and alternately, at will, with one hand; second, to provide a hand reel, which, in being wound up, is capable of being held fixedly at any place in the line, without employing but one hand, until the operator desires again to proceed; third, to provide a reel capable of carrying two lines of different sizes and lengths, and of allowing them to be let out or taken in separately, without interference with each other; fourth, to provide a reel capable of being adjusted to carry lines of different sizes and lengths at will; fifth, to provide a reel which may be handled more easily by a person having tender hands or weak wrists; sixth, to provide a reel balanced in such manner upon the journal of the operating crank, that in operation the leverage is transferred from the wrist to the forearm, of the same hand, thus removing the danger of spraining the wrist; seventh, to provide a reel, which is light, and cheap of manufacture, and capable of being held on the forearm, by the operator, while a line is being put up or taken down, leaving both hands free, during such process, to handle the line; other objects will appear from the specifications.

I attain these objects by the mechanism illustrated in the accompanying drawing, in which—

Figure 1, is a plan view of the machine.

Fig. 2, is a side elevation of one of the side bars, and disclosing the attachments secured thereon, and illustrating the manner of their operation.

Fig. 3, is a sectional view of broken portions of the journal end of the crank and side bar in which it is mounted.

Fig. 4, is a side elevation of the crank.

Fig. 5, is a plan view of the latch.

Fig. 6, is an edge view of a broken portion of the center bar, disclosing the spring plate and pin attachment.

Similar numerals refer to similar parts throughout the several views.

The framework of my invention is a reel having side bars 1 and 2 secured adjacent their respective ends by hole and pin means 7, upon the respective ends of a pair of rungs 4 and 6.

Bar 2 has disposed between one of its ends and one of said rungs, a boxing $2^b$, supporting rotatably, a journal $23^b$, which journal terminates in a handle 24 disposed upon the outward side of said bar, and is secured thereto by nut means $23^d$, the said handle 24 having a loop 23 returning circularly to said journal $23^b$, creating a hole $23^c$ capable of receiving the arm of the operator, when carrying or operating the same.

Bars 1 and 2 have the insides of their ends $2^a$ tapered outwardly and when mounted on rungs 4 and 6 such ends form crotches within which a line secured to either of hooks 12 or 14 may be wound.

Between bars 1 and 2 upon rungs 4 and 6 I provide a bar 3, having its ends tapered from each side $3^a$, bar 3 is movably secured upon rungs 4 and 6 by hole means $3^b$ spaced suitably near its ends which bar 3 is longer than either of bars 1 and 2, and for the purpose of securing it in fixed positions temporarily upon rungs 4 and 6 I have provided holes $6^a$ and $4^c$ in said rungs, correspondingly with like holes in the ends of said bar 3, and have also provided a pair of spring plates 19 of V-shape, which plates are capable of being sprung in their middles, and have a pin 17 respectively secured to their respective broad ends 20, which, when the said broad ends are not lifted up, engage connectedly through the said holes $3^b$ provided in the edge of the said bar 3 and the said holes $4^c$ and $6^a$ in said rungs, and which spring plates 19 are secured to the edge of bar 3, by screw means 21, in plate end 22.

When I wish to move bar 3 to another position I lift the broad ends of plates 19 thus removing pins 17 from the holes $4^c$ and $6^a$ and slide bar 3 to the desired position, when I again allow the pins 17 to engage in the desired holes, thus resecuring bar 3 at the desired place.

In the middle of bar 1 I provide a transverse hole 13, which serves as a boxing for journal end $9^a$ of crank 9, upon which journal 9ª the reel revolves, and I secure the reel upon said journal by a cotter pin 8 through hole 9ᵉ provided in the end of said journal. To facilitate free revoluble movement and to add strength and stability I provide a washer 5 between cotter pin 8 and bar 1, and for similar reasons I have provided a flanged shoulder 13ª of the right angular butt end of crank 9, as a complement to journal 9ª, to operate snugly against the side of bar 1.

Around hole 13 and secured by screw means 14ª and 15 to the outside of bar 1, I provide a circle-iron 18 having a plurality of transverse holes 18ª provided therein suited to receive the nib 11ᵈ of latch 11, which circle iron, nib and holes are for the purpose of regulating the revoluble movement of the said reel upon said journal 9ª of crank 9.

Crank 9 is a flat bar having a right angular offset 9ᵉ in its middle, said off-set 9ᵉ being directioned with the edge of said crank. In one of the ends of said crank 9 I provide a boxing 9ⁱ, in which I provide a journal 9ʰ, secured by a nut 9ᵏ, which journal has a flanged shoulder 9ʲ, which journal 9ʰ terminates in a loop-handle 9ᶠ, the loop of which I designate as 9ᵍ, and which loop is formed sufficiently large to admit the hand and forearm of an ordinary adult person, and may be extended or reduced by strap means, as may also loop 23 of handle 24.

Between off-set 9ᵉ and journal end 9ª of crank 9, I provide a handle 10 which handle 10 is secured to said crank 9 by bolt and nut means 10ᵇ. Handles 9ᶠ and 10 are each directioned oppositely from the journaled end of crank 9.

Transversely through crank 9, between handle 10 and the right angular turn of journal end 9, I provide an oblong hole 9ᵇ, suitable to receive latch 11 and to allow latch 11 to vibrate in a direction parallel with the longer dimension of said crank 9 upon a pin 16, which pin 16 extends through transverse hole 9ᵈ, of crank 9 and transverse hole 11ᵇ of latch 11, the purpose being the operation of latch 11, as hereinafter described.

Latch 11 is formed of an oblong metallic bar, bent to a right-angle, and having one of its ends bent to a loop 11ª, the loop being disposed upon the outside of the angle, said latch 11 having its other end bent to an abrupt off-set, forming a nib 11ᵈ, suitable to engage in holes 18ª of circle iron 18, as disclosed in Fig. 2, while that angle of latch 11 nearest the loop 11ª, is suitably provided with hole 11ᵇ to receive pivot pin 16, and that angle nearest nib 11ᵈ, is bent into a quarter circle 11ᶜ, suitable to permit that end of latch 11 to pass over and beyond the journal end 9ª of crank 9, in such manner as to permit nib 11ᵈ, to engage with hole 18ª in circle iron 18 at a point adjacent to its connection with bar 1, when bar 1 and crank 9 are found paralleling each other as shown in Figs. 1 and 2, and to engage the other holes as it reaches them, as desired.

It is obvious that by putting the hand through swivel 9ᶠ and grasping handle 10 with the forefinger of that hand inserted in loop 11ª of latch 11, and closing the finger firmly to the handle, the reel will be released, and by releasing the forefinger, the nib 11ᵈ will engage in one of the holes 18ª in circle iron 18, thus engaging the reel, and that the reel will remain thus engaged when the finger and hand may be removed from handle 10, when the reel will then hang loosely, but secured against turning, upon the arm, and then both hands of the operator will be left free for use.

When it is desired to wind the line upon the reel, one hand is inserted through swivel 9ᶠ, seizing handle 10 and with the forefinger releasing latch 11 from circle iron 18, and seizing handle 24 with the other hand, the line is wound to any point desired.

I claim:

1. In a hand reel, a frame composed of a pair of side bars mounted on a pair of rungs; a center bar, the said center bar being longer than the said side bars, having its ends tapered from each side, and being mounted upon said rungs between said side bars, capable of being moved from side to side upon said rungs, and of being held in place thereon by spring pin means secured thereon; spring pin fastening means secured upon the edge of a center bar; vertically disposed hole means spaced between the side bars of the frame, within the connecting rungs, said vertical hole means being suitable for receiving the pin of the spring pin means provided within the edge of the said center bar.

2. In a line reel having a pair of side bars mounted on a pair of rungs and having another bar centrally movably mounted upon said rungs between said side bars; a movable center bar having pin fastening means secured upon either of its ends, said spring pins capable of holding said center bar in position upon said rungs; a spring plate having said pin means provided in one of its ends suitable for engaging with holes in a rung through a hole in said center bar, screw means provided in the other end of the said spring plate, said plate capable of being sprung between said screw and said pin sufficiently to release the pin from the hole in the rung.

3. In a line reel having a pair of side bars mounted on a pair of rungs; a handle secured upon one of said side bars between one of said rungs and the end of said bar, said handle being formed into a loop; journal attaching means secured to said bar, rotatably supporting said handle, suitable to permit said reel to turn when said loop-handle is fixedly held, said journal being revolubly secured to said bar by screw nut means, provided upon the end of said journal.

4. In a line reel consisting of a frame composed of bars mounted on rungs, said bars having ends which project beyond said rungs; a crank having a rotatable handle at one of its ends, another fixed handle midway disposed upon one of its sides, said crank also having a right-angularly disposed flanged end and flanged end being directioned opposite from said handles, the extremity of said right angularly flanged end being formed into a journal suitable to operate in a transverse boxing provided in one of the side bars of the said reel, the extremity of said journal end also having transverse hole means provided therein suitable to receive cotter pin means, suitable, with washer means, for holding said journal within the said boxing of said side-bar, flanged shoulder means provided in the right angularly flanged end of said crank, adjacent said journal portion suitable to prevent lateral movement of said journal in the said boxing of the said side bar, and suitable with said journal to form a turning base for said reel, when said reel is rotatably secured upon said crank.

5. In a line reel, a crank secured to one of its side bars, by journal means, suitable to permit said reel to be turned thereon, when said crank is held fixedly in the hand of the operator, said crank having disposed upon one of its sides a rotatable handle secured by journal, hole-boxing and nut means provided therefor, upon one of its ends, said handle being formed into a loop suitable to facilitate the holding of said crank securely upon the arm of the operator, and to better facilitate the operation of the reel upon the other end of said crank, when said crank is held by means of said loop handle and other handle means which is provided fixedly on the side of said crank, between its ends, said crank also having an off set provided midway between the angulated journal end and the handle end, said offset being disposed toward its edge, and said crank also having an oblong hole transversely provided in the end of said crank suitably near unto said angulate end, another hole intersecting said oblong hole and another transverse hole disposed between said oblong hole and said offset provided in the middle of said crank.

6. In a line reel composed of a frame having a side bar operating rotatably upon the rightangularly disposed journal end of a crank paralleling said bar, and having a circle iron encircling the boxing hole of said side bar within which said journal operates, secured to the side of said side bar adjacent said crank; a right angular trigger, having a loop provided in the outer end of one of its angles and having a nib off-set provided in the outer end of the other of its said angles, said nib and loop each being outwardly disposed from the said angle, said angle adjacent the said nib, being bent to a quarter circle at right angles from the direction of said crank when mounted therein suitably to permit said quarter circle to pass over and beyond the right angular extremity of the said crank; transverse hole means provided in the loop end of the said trigger suitable to permit the said trigger to be secured movably within an oblong transverse hole means provided within said crank, by pin means connectedly inserted through said hole and an intersecting hole provided in said crank.

7. In a line reel composed of side bars mounted upon rungs, and operated upon a crank; a reel having a vertically disposed circle iron secured upon the outside of a side bar, said circle iron being disposed about hole boxing means provided in one of said side bars suitable for the insertion therein of the journal of said crank, said circle iron having a plurality of transverse holes evenly and centrally disposed in its surface suitable to receive the nib end of a crank trigger when said circle iron is revolved about said journal end of said crank; other transverse hole means provided in the edge of the surface of said circle iron suitable for securing the said circle iron by screw means to the side of said side bar.

Davenport, Iowa, January 7th 1922.

NON H. BROWN.

Witnesses:
WILLIAM H. SHELTON,
S. A. D. STRINGER.